United States Patent [19]

Prince

[11] Patent Number: 5,293,227
[45] Date of Patent: Mar. 8, 1994

[54] SELF-SYNCHRONIZING OPTICAL STATE CONTROLLER FOR INFRARED LINKED STEREOSCOPIC GLASSES

[75] Inventor: Dennis W. Prince, Banks, Oreg.

[73] Assignee: Tektronix, Inc., Wilsonville, Oreg.

[21] Appl. No.: 919,815

[22] Filed: Jul. 24, 1992

[51] Int. Cl.⁵ ............................................. H04N 13/04
[52] U.S. Cl. ................................................... 348/53
[58] Field of Search ............. 358/88, 92; H04N 13/04

[56] References Cited

U.S. PATENT DOCUMENTS

| | | | |
|---|---|---|---|
| 3,737,567 | 6/1973 | Kratomi | 358/92 |
| 4,424,529 | 1/1984 | Roese et al. | 358/88 |
| 4,562,463 | 12/1985 | Lipton | 358/88 |
| 4,582,396 | 4/1986 | Bos | 358/61 |
| 4,698,668 | 10/1987 | Milgram | 358/92 |
| 4,719,507 | 1/1988 | Bos | 358/92 |
| 4,772,943 | 9/1988 | Nakagawa et al. | 358/92 |
| 4,772,944 | 9/1988 | Yoshimura | 358/92 |
| 4,884,876 | 12/1989 | Lipton et al. | 359/64 |
| 4,967,268 | 10/1990 | Lipton et al. | 358/92 |
| 5,028,994 | 7/1991 | Miyakawa | 358/92 |
| 5,117,302 | 5/1992 | Lipton | 358/92 |

Primary Examiner—Howard W. Britton
Attorney, Agent, or Firm—John D. Winkelman; Aldous052918646

[57] ABSTRACT

A pair of infrared linked stereoscopic glasses (18) receives a train of short infrared pulses from a transmitter (26) of a stereoscopic imaging system (10). The rising edges of the infrared pulses are synchronized with the beginnings of the even numbered fields of a stereoscopic image displayed on a video display (14). In a stereo mode, the glasses provide a three-dimensional appearance because right and left liquid crystal cells (40 and 42) switch right- and left-eye pieces (20 and 22) between transmissive and opaque states synchronously with the even and odd fields of the stereoscopic image. In a flickerless mode, the right- and left-eye pieces are both essentially continuously transmissive. An optical state controller (36) is self-synchronizing in that a single pulse of the electrical pulse train signal will control the optical states of both the right- and left-eye pieces during a complete stereoscopic image. The transmitted IR pulses are not modulated and the electrical pulse train signal produced in response to the received IR pulses is not demodulated. The glasses automatically switch from stereo mode to flickerless mode when the glasses cease receiving the IR pulses. The glasses automatically switch from flickerless mode to stereo mode when the glasses begin to receive the IR pulses. The maximum voltage (VDD) applied to the electrodes (184, 186, 206, and 208) of the right and left liquid crystal cells is substantially higher in stereo mode than that in flickerless mode.

17 Claims, 5 Drawing Sheets

SELF-SYNCHRONIZING OPTICAL STATE CONTROLLER FOR INFRARED LINKED STEREOSCOPIC GLASSES

TECHNICAL FIELD

The present invention relates to an optical state controller that controls the optical states of right- and left-eye pieces in a pair of infrared linked stereoscopic glasses and, in particular, to a self-synchronizing optical state controller that controls the optical states based on the timing of a single infrared pulse in a train of infrared pulses.

BACKGROUND OF THE INVENTION

Stereoscopic imaging systems have been employed to give a three-dimensional appearance to field sequential images displayed on a video display screen. The three-dimensional appearance is created by active stereoscopic glasses that switch between opaque and transmissive optical states to alternately transmit to a viewer left- and right-eye views of a stereoscopic image that is sequentially displayed on the screen. The viewer fuses the separate left- and right-eye views into a single stereoscopic image.

In certain prior stereoscopic imaging systems, the active stereoscopic glasses are linked to the video display with wires. This is undesirable, however, because the wires tether the viewer to the video display. To overcome this problem, other stereoscopic imaging systems have used electromagnetic radiation to link the stereoscopic glasses to the video display. For example, U.S. Pat. No. 4,967,268 of Lipton et al. ("Lipton et al. patent"), entitled "Liquid Crystal Shutter System for Stereoscopic and Other Applications," describes electromagnetically linked active stereoscopic glasses.

In the system of the Lipton et al. patent, the transmitted electromagnetic signal includes pulse width modulated information. As shown in FIG. 10 and described in col. 7, lines 30–68 of the Lipton et al. patent, the electromagnetic signal includes a 61 microsecond start pulse. If the electromagnetic signal continues for an additional 61 microseconds following the start pulse, the signal receiver circuitry causes the left-eye piece to be transmissive and the right-eye piece to be opaque. If the electromagnetic signal is not present for the next 61 microseconds following the start pulse, the signal receiver circuitry causes the right-eye piece to be transmissive and the left-eye piece to be opaque. The demodulating circuitry employed in the signal receiver circuitry creates unnecessary complexity and expense.

There is a need, therefore, for electromagnetically linked stereoscopic glasses that do not employ demodulating circuitry.

SUMMARY OF THE INVENTION

An object of the present invention is, therefore, to provide electromagnetically linked stereoscopic glasses that do not employ demodulating circuitry.

A pair of infrared linked stereoscopic glasses receives a train of short infrared pulses from a transmitter of a stereoscopic imaging system. The rising edges of the infrared pulses are synchronized with the beginnings of the even numbered fields of a stereoscopic image displayed on a video display. In a stereo mode, the glasses provide a three-dimensional appearance because right and left liquid crystal cells switch the right- and left-eye pieces between transmissive and opaque states synchronously with the even and odd fields of the stereoscopic image. In a flickerless mode, the right- and left-eye pieces are both essentially continuously transmissive. An optical state controller is self-synchronizing in that a single pulse of the electrical pulse train signal will control the optical states of both the right- and left-eye pieces without modulating the transmitted IR pulses or demodulating the electrical pulse train signal produced in response to the received IR pulses. The glasses automatically switch from stereo mode to flickerless mode when the glasses cease receiving the IR pulses. The glasses automatically switch from flickerless mode to stereo mode when the glasses begin to receive the IR pulses. The maximum voltage (VDD) applied to the electrodes of the right and left liquid crystal cells is substantially higher in stereo mode than that in flickerless mode.

Additional objects and advantages of the present invention will be apparent from the detailed description of preferred embodiments thereof, which proceeds with reference to the accompanying drawings.

DETAILED DESCRIPTION OF PREFERRED EMBODIMENTS

Figure 1:
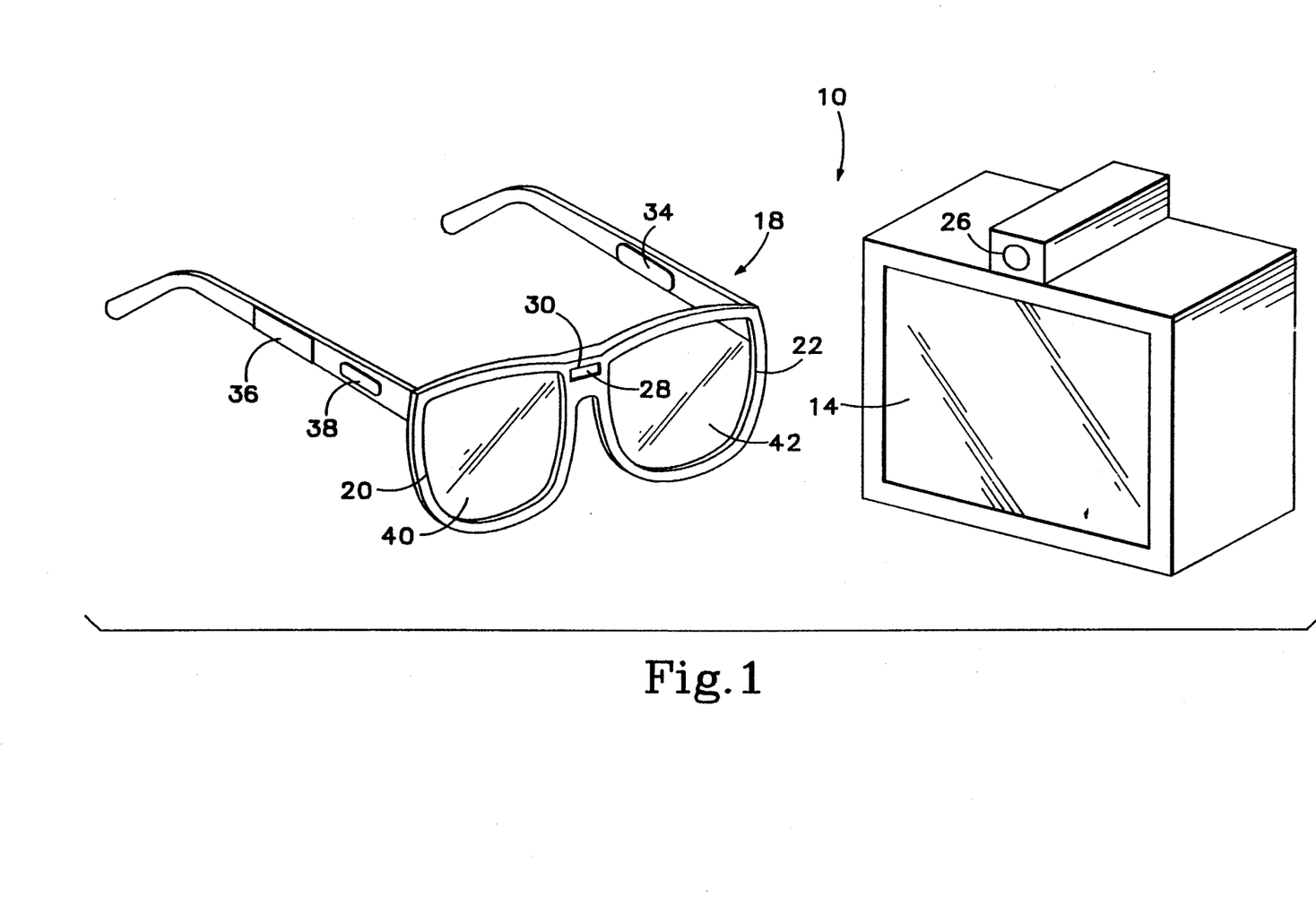
FIG. 1 shows a display and glasses according to the present invention.

Referring to FIG. 1, a stereoscopic imaging system 10 includes a display 14 and stereoscopic glasses 18 having right- and left-eye pieces 20 and 22. A viewer (not shown) may view a field sequential stereoscopic image including right- and left-eye views on display 14 through right- and left-eye pieces 20 and 22. The fields are produced such that the image appears to be in three dimensions to the viewer when right-eye piece 20 is opaque and left-eye piece 22 is transmissive during, for example, even numbered fields, and left-eye piece 22 is opaque and right-eye piece 20 is transmissive during odd numbered fields.

A transmitter 26 transmits a train of short pulses of electromagnetic radiation, the rising edges of which are synchronized with the beginnings of, for example, the even numbered fields. The preferred frequency of the electromagnetic radiation depends on the application of imaging system 10. For example, where there are multiple persons each viewing different screens, a preferred frequency may be in the infrared (IR) range. By contrast, where many persons are viewing a single screen, a preferred frequency may be in the radio frequency range. In the following description, however, it is assumed the electromagnetic frequency is in the IR range, and the electromagnetic pulses are referred to herein as IR pulses. The IR pulses may have durations of about 20 microseconds. Although they are preferably of rectangular shape, the IR pulses may have an irregular shape or include multiple rectangular subpulses provided that right- or left-eye view timing information is not modulated onto the pulse. The period of the train of IR pulses is dependent on the frequency at which fields are displayed on display 14.

The IR pulses are received by receiver 28 of stereoscopic glasses 18. Receiver 28 is positioned in a recess 30 in the frame of glasses 18. The walls of recess 30 prevent receiver 28 from receiving IR pulses unless right- and left-eye pieces 20 and 22 are directed toward display 14. Accordingly, glasses 18 will not respond to IR pulses from a transmitter associated with another display near display 14. Recess 30 may not be preferred where radio frequency is used.

Figure 2:
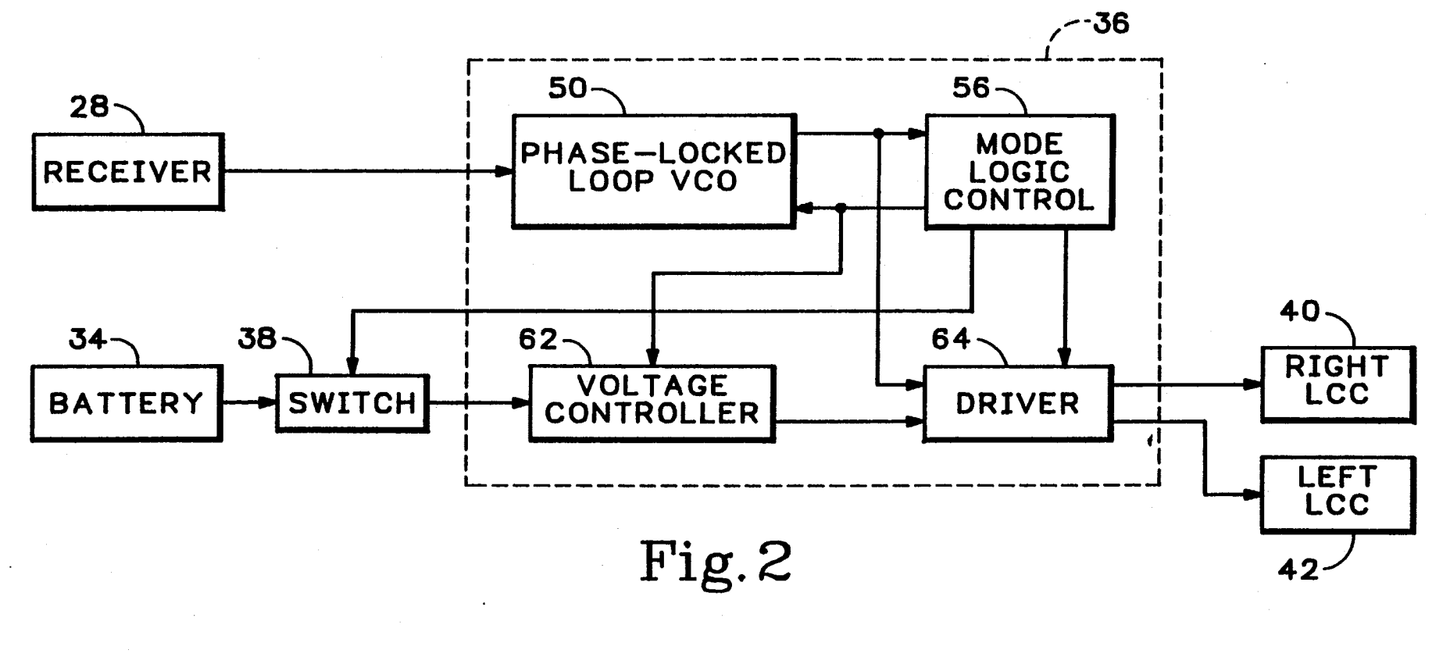
FIG. 2 shows components of the stereoscopic glasses of the present invention in block diagram form.

FIG. 2 shows various components of glasses 18 in block diagram form. Referring to FIGS. 1 and 2, glasses 18 include battery 34, switch 38, and optical state controller 36. Right- and left-eye pieces 20 and 22 (FIG. 1) each contain a light polarization state changer such as a variable optical retarder. An example of a variable optical retarders include right and left liquid crystal cells 40 and 42, respectively, which may be of the type described in U.S. Pat. No. 4,582,396 of Bos et al. entitled "Field Sequential Color Display System Using Optical Retardation." Right- and left-eye pieces 20 and 22 include polarizers in a well-known arrangement with right and left liquid crystal cells 40 and 42. Electrical power from battery 34 is provided to each component of glasses 18 through switch 38.

In operation, receiver 28 provides an electrical pulse to a phase-locked loop VCO 50 in response to each IR pulse received by receiver 28. An advantage of the pulse train scheme employed in the present invention is that the recovery time of the receiver, and the effect of saturation on the recovery time, is unimportant. By contrast, the recovery time is very important in the pulse width modulated system of the Lipton et al. patent. The difficulty in recovery-time sensitive systems arises because the receiver may be, for example, from 6 inches to 20 feet from the transmitter whose power call fall off according to the square of the distance. Accordingly, it is difficult to prevent saturation of the receiver at 6 inches.

Receiver 28 may be of the type that is well known to those skilled in the art. Receiver 28 may include some signal processing and filtering circuitry, which may be located physically adjacent to optical state controller 36. For example, receiver 28 may include a filter of the type described in copending U.S. patent application Ser. No. 07/919,814 entitled "Ambient Light Filter for Infrared Linked Stereoscopic glasses," of Allen, filed concurrently herewith and owned by Tektronix, Inc., the assignee of the present application.

Figure 4:
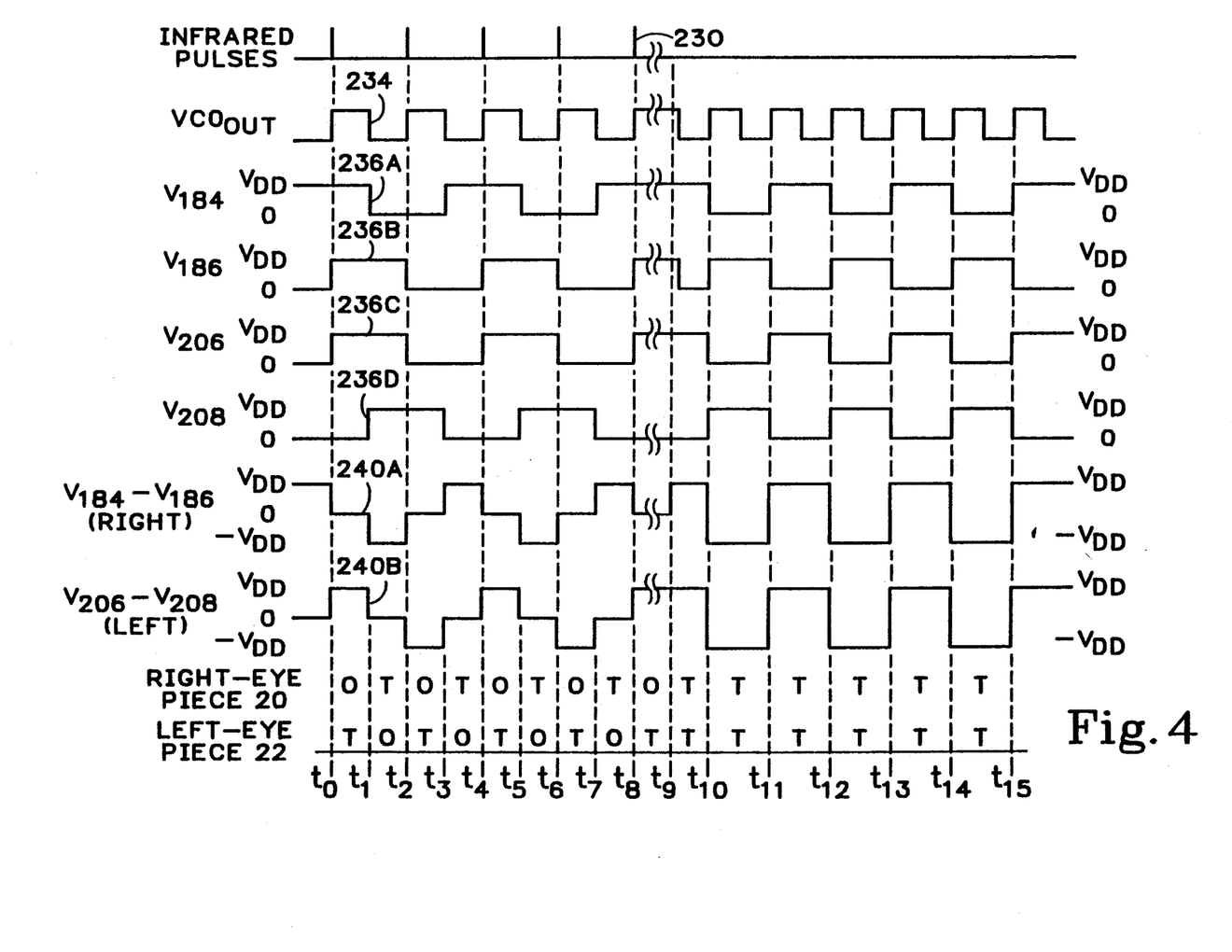
FIG. 4 shows timing diagrams of various signals employed in the present invention.

Glasses 18 may be in one of three states: stereo mode, flickerless mode, or off mode. In stereo mode, glasses 18 provide a three-dimensional appearance because right and left liquid crystal cells 40 and 42 cause right- and left-eye pieces 20 and 22 to switch between transmissive and opaque states synchronously with the even and odd fields of the stereoscopic image. In flickerless mode, right- and left-eye pieces 20 and 22 are continuously transmissive except when right and left liquid crystal cells 40 and 42 switch between positive and negative voltages as shown in FIG. 4. In off mode, switch 38 is open and power from battery 34 is not provided to the components of glasses 18. Glasses 18 automatically switch between stereo and flickerless mode when receiver 28 stops receiving IR pulses. If IR pulses have not been received within a predetermined time (e.g., 2.5 minutes), glasses 18 switch between flickerless mode and off mode to conserve power of battery 34. If IR pulses are received within the predetermined time, glasses 18 automatically switch between flickerless mode and stereo mode.

VCO 50 and a mode logic circuit 56 set the mode of operation. Voltage controller 62 sets the voltage VDD of driver 64 based on the voltage of a signal from mode logic circuit 56. Driver 64 provides voltage signals to right and left liquid crystal cells 40 and 42. The left and right liquid crystal cells 40 and 42 are driven by an alternating signal having a maximum voltage VDD, which is set by voltage controller 62. The frequency of switching between left and right liquid crystal cells 40 and 42 in stereo mode is derived from the frequency FVCO of a square wave provided at an output of VCO 50. During flickerless mode, the frequency FVCO is the maximum frequency of VCO 50, which is above the flicker fusion rate. The following chart summarizes the values of voltage VDD and FVCO for the three modes of glasses 18.

| Mode | VDD | FVCO |
| --- | --- | --- |
| Stereo | ≈ 15 volts | Synchronized with incoming IR (e.g., 30 Hz) |
| Flickerless | ≈ volts | high (e.g., 95 Hz) above flicker fusion rate |
| Off | 0 volts | 0 Hz |

The various blocks of FIG. 2 are discussed below in detail with reference to FIGS. 3-5.

Figure 3:
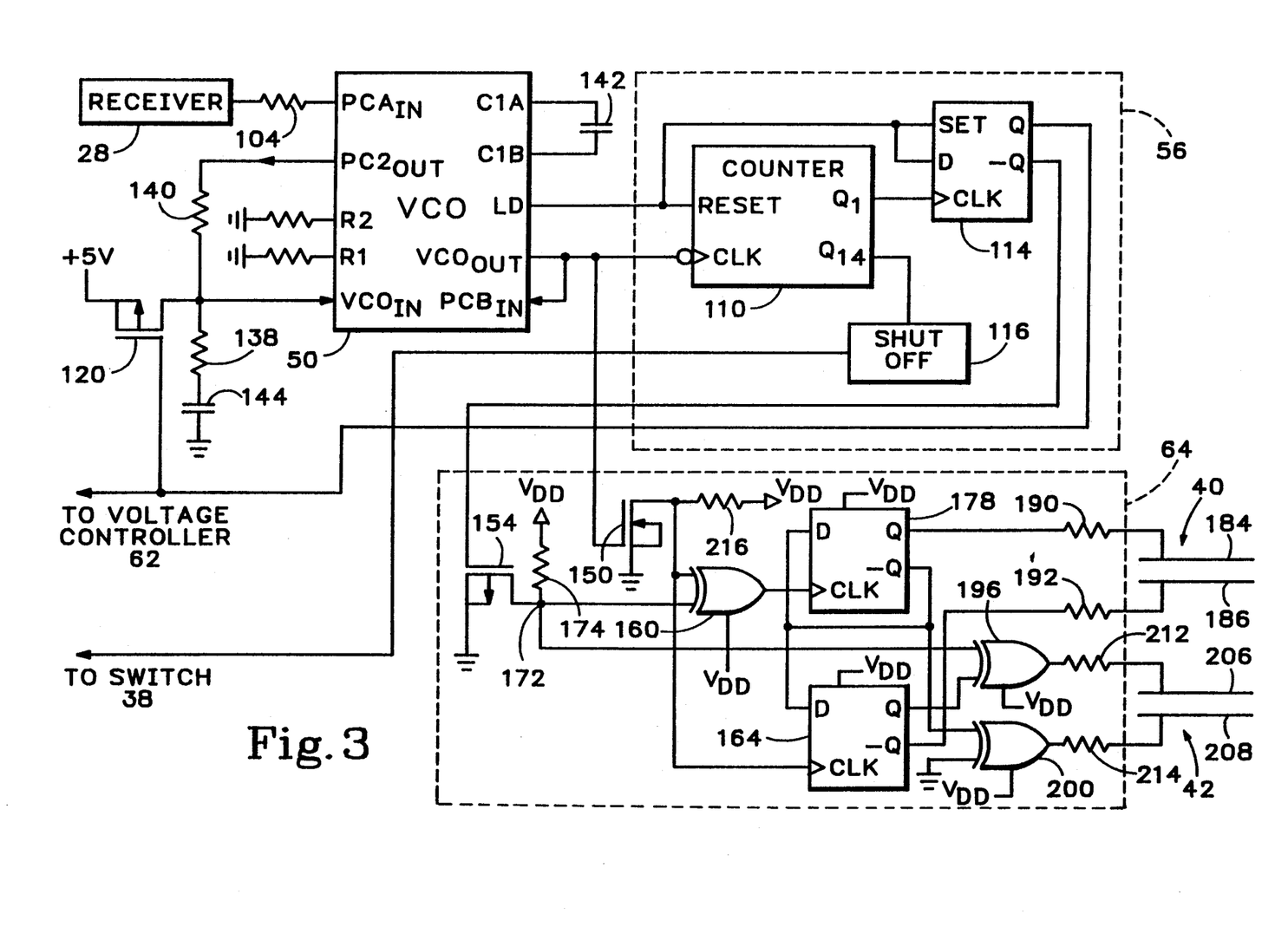
FIG. 3 shows the voltage controlled oscillator (VCO), mode logic circuit, driver, and left and right liquid crystal cell blocks of FIG. 2 in detailed schematic form.

FIG. 3 shows VCO 50, mode logic circuit 56, and driver 64 in detail. VCO 50 may be a Motorola MC14046B phase-locked loop chip, and the inputs and outputs of VCO 50 referred to herein will be those of the Motorola MC14046B. The phase comparator input PCAin of VCO 50 receives the electrical pulse train signal from receiver 28 through a 1 kohm resistor 104. VCO 50 provides a square wave having a frequency FVCO at the VCOout output of VCO 50. The value of frequency FVCO is controlled by the voltage at an input VCOin of VCO 50.

When the electrical pulse train signal is received at input PCAin (causing glasses 18 to be in stereo mode), VCO 50 causes the rising edge of the square wave at output VCOout to be synchronized with the pulses of the electrical pulse train signal received at input PCAin. In the following described embodiment, VCO 50 is designed to operate at between about 25 Hz and 95 Hz. Accordingly, the electrical pulse train signal from receiver 28 may have a frequency between about 25 Hz and 95 Hz.

VCO 50 includes an output LD. When input PCAin receives the electrical pulse train signal, the signal at output LD has a logic high voltage (except for very brief drops to a logic low voltage in response to the leading edge of the pulses of the electrical pulse train signal). When input PCAin does not receive the electrical pulse train signal, the signal at LD has a logic low voltage. Output LD is connected to the Reset input of a fourteenbit binary counter 110 and to the Set and D inputs of a D flip-flop 114, which are included in mode logic circuit 56. During stereo mode, either counter 110 does not count during the brief voltage drops of the signal at output LD, or the signal at output LD reassumes a logic high voltage before the signal at output Q1 of counter 110 clocks D flip-flop 114. Consequently, the signal at the Q output of D flip-flop 114 has a logic high voltage throughout stereo mode.

Outputs Q2–Q13 are not connected, but output Q14 is connected to a shut-off circuit 116 that switches glasses 18 into off mode when output Q14 assumes a logic high voltage. It takes about 2.5 minutes for counter 110 to count during flickerless mode from 0 to $2^{14}$. The purpose of switching to off mode is to conserve the power of battery 34.

During stereo mode, while the LD output delivers a logic high voltage, the Q and −Q outputs of D flip-flop 114 deliver logic high and low voltages, respectively. The Q output of D flip-flop 114 is connected to the gate of a p-channel field effect transistor (FET) 120. As long as the Q output of D flip-flop 114 delivers a logic high voltage, FET 120 does not conduct and the FVCO tracks the frequency of the electrical pulse train signal received by the PCAin input. Resistors 138 and 140 may have values 453 kohms and 4.75 kohms, respectively. Capacitors 142 and 144 may each have a value of 0.1 microfarad The maximum and minimum values of frequency FVCO are inversely related to the resistance values of the resistors attached to inputs R1 and R2, respectively. The resistors attached to R1 and R2 may have resistance values of 1 Mohms and 200 kohms, respectively.

When receiver 28 ceases to receive IR pulses, VCO 50 ceases to receive the electrical pulse train signal at the PCAin input. Consequently, the signal at the output LD assumes a logic zero voltage. Counter 110 begins counting and the Q and −Q outputs of D flip-flop 114 deliver logic low and high voltages, respectively. When the Q output delivers a logic zero voltage, FET 120 conducts and the voltage at input VCOin is set to 5 volts. With the voltage at input VCOin at 5 volts, FVCO increases and remains at the maximum frequency (e.g., 95 Hz), which is above the flicker fusion rate. At the maximum frequency, glasses 18 are in flickerless mode.

The VCOout output of VCO 50 and the −Q output of D flip-flop 114 are connected to the drains of n-channel FETs 150 and 154, respectively, which are included in driver 64. FET 150 acts as a level shifter raising the maximum level of the square wave to VDD. FET 150 also inverts the square wave signal at output VCOout. The drain of FET 150 is connected to an input of an exclusive-or gate 160 and the clock input of a D flip-flop 164. The other input to exclusive-or gate 160 is a node 172 that is connected to a pull-up resistor 174 and the drain of FET 154.

When the signal at output LD delivers a logic high voltage, the −Q output of D flip-flop 114 delivers a low voltage, and FET 154 does not conduct. Accordingly, the voltage at node 172 and the associated input of exclusive-or 160 is VDD. When that input of exclusive-or gate 160 is equal to VDD, exclusive-or gate 160 acts as an invertor to the signal at the drain of FET 150. The output of exclusive-or gate 160 is applied to the clock input of a D flip-flop 178. Accordingly, the inputs to the clocks of D flip-flops 164 and 178 are square waves 180° out of phase with each other.

The Q and −Q outputs of D flip-flops 164 and 178 alternate between zero and VDD because the D inputs of D flip-flops 164 and 178 are each connected to the −Q output of D flip-flop 178. The four square wave signals at outputs Q and −Q of D flip-flops 164 and 178 each have a period that is twice that of the square wave at the VCOout output of VCO 50. The Q output of D flip-flop 178 and the −Q output of D flip-flop 164 are connected to electrodes 184 and 186, respectively, through resistors 190 and 192. As shown in FIG. 4, between time t0 and time t8, the signals at electrodes 184 and 186 are square waves, which are 270° out of phase and have voltages V184 and V186 between O and VDD. Electrodes 184 and 186 sandwich liquid crystal material in right liquid crystal cell 40 in right eye-piece 20.

The inputs of an exclusive-or gate 196 are connected to the Q output of D flip-flop 164 and node 172. In stereo mode, FET 154 does not conduct and node 172 has a voltage VDD. Accordingly, the output of exclusive-or gate 196 is the inversion of the logic voltage value of the Q output of D flip-flop 164. One input of an exclusive-or gate 200 is connected to ground. Accordingly, the output of exclusive-or gate 200 is equal to the voltage of the −Q output of D flip-flop 178. The outputs of exclusive-or gates 196 and 200 are connected to electrodes 206 and 208 through resistors 212 and 214. As shown in FIG. 4, between time t0 and time t8, the signals at electrodes 206 and 208 are square waves which are 90° out of phase and have voltages V206 and V208 between zero and VDD. Electrodes 206 and 208 sandwich liquid crystal material in left liquid crystal cell 42 in left-eye piece 22. The difference between voltages V184 and V186, and the difference between voltages V206 and V208, each alternate between VDD, zero, and −VDD, and are 90° out of phase with each other.

Resistors 174 and 216 each may have a resistance value of 100 kohms. Resistors 190, 192, 212, and 214 each may have a resistance value of 681 ohms.

When the PCAin input stops receiving the electrical pulse train signal, the LD output of VCO 50 assumes a logic low voltage causing FET 154 in driver 64 to conduct. Therefore, node 172 has a voltage value substantially lower than VDD, which is set to about 3.7 volts. The signals at the inputs of exclusive-or gates 160 and 196 that are connected to node 172 each have logic low voltages. Accordingly, the outputs of exclusive-or gates 160 and 196 are equal to the voltages of the drain of FET 150 and the Q output of D flip-flop 164, respectively. Therefore, the clock signals to D flip-flops 164 and 178 are in phase. Consequently, as shown in FIG. 4, from time t9 to time t15, the signals at electrodes 184 and 186 are square waves, which are 180° out of phase and have voltage V184 and V186 alternating between zero and VDD. Likewise, signals at electrodes 206 and 208 are also square waves 180° out of phase and have voltages V206 and V208 alternating between zero and VDD. The difference between voltages V184 and V186, and the difference between voltages V206 and V208, each alternate between VDD and −VDD, and are in phase with each other (but could be out of phase with each other). Accordingly, right- and left-eye pieces 20 and 22 are continuously transmissive except during the brief transitions from positive to negative voltage.

FIG. 4 is a timing diagram that shows the relationship between the IR pulses 230 received by receiver 28 and the voltages of various signals in optical state controller 36. Waveform 234 represents the voltage of the square wave at VCOout. Waveforms 236A, 236B, 236C, and 236D represent voltages V184, V186, V206, and V208, Which are the voltages at electrodes 184, 186, 206, and 208, respectively Waveform 240A represents the difference between voltages V184 and V186. Waveform 240B represents the difference between voltages V206 and V208.

From time t0 to time t8, receiver 28 receives IR pulses, and glasses 18 are in stereo mode. The frequency FVCO is equal to the frequency of the IR pulses. The leading edges of waveforms 236A, 236B, 236C, and 236D, and waveforms 240A and 240B, are each synchronized with IR pulses 230 or are out of phase by a multiple of 90°.

Glasses 18 switch from stereo mode to flickerless mode between time t8 and time t9. The frequency FVCO increases from, for example, 30 Hz to about 95 Hz. The leading edges of waveforms 236A, 236B, 236C, and 236D, and waveforms 240A and 240B, are each in phase with a leading edge of waveform 234. The maximum voltage of waveforms 236A, 236B, 236C, and 236D, and waveforms 240A and 240B, is VDD. The value of VDD is about 15 volts from time t0 to time t8 during stereo mode and about 3.7 volts from time t9 to time t15 during flickerless mode. The respective optical states of right- and left-eye pieces 20 and 22 from time t0 to time t15 is represented in FIG. 4 by an "O" for opaque or a "T" for transmissive.

As is apparent from FIGS. 3 and 4, during the first half of the time between IR pulses 230, there is an absolute potential difference of VDD between electrodes 206 and 208 of left liquid crystal cell 42, and no potential difference between electrodes 184 and 186 of right liquid crystal cell 40. Accordingly, left-eye piece 22 is transparent and right-eye piece 20 is opaque. During the second half of the time between IR pulses 230, there is an absolute potential difference of VDD between electrodes 184 and 186 of right liquid crystal cell 40, and no potential difference between electrodes 206 and 208 of left liquid crystal cell 42. Accordingly, right-eye piece 20 is transparent and left-eye piece 22 is opaque.

Therefore, glasses 18 are self-synchronizing in that a single IR pulse of the IR pulse train and resulting electrical pulse of the electrical pulse train signal will control the optical states of both right- and left-eye pieces 20 and 22 during a complete stereoscopic image. Modulating the transmitted IR signal or demodulating an electrical signal produced in response to the received IR signal is not necessary or employed. VCO 50 locks onto the frequency of the electrical pulse train signal (provided it and the incoming IR pulses are within the frequency range of VCO 50, e.g., 25 Hz to 95 Hz), and driver 64 locks onto the square wave at the VCOout output of VCO 50.

Figure 5:
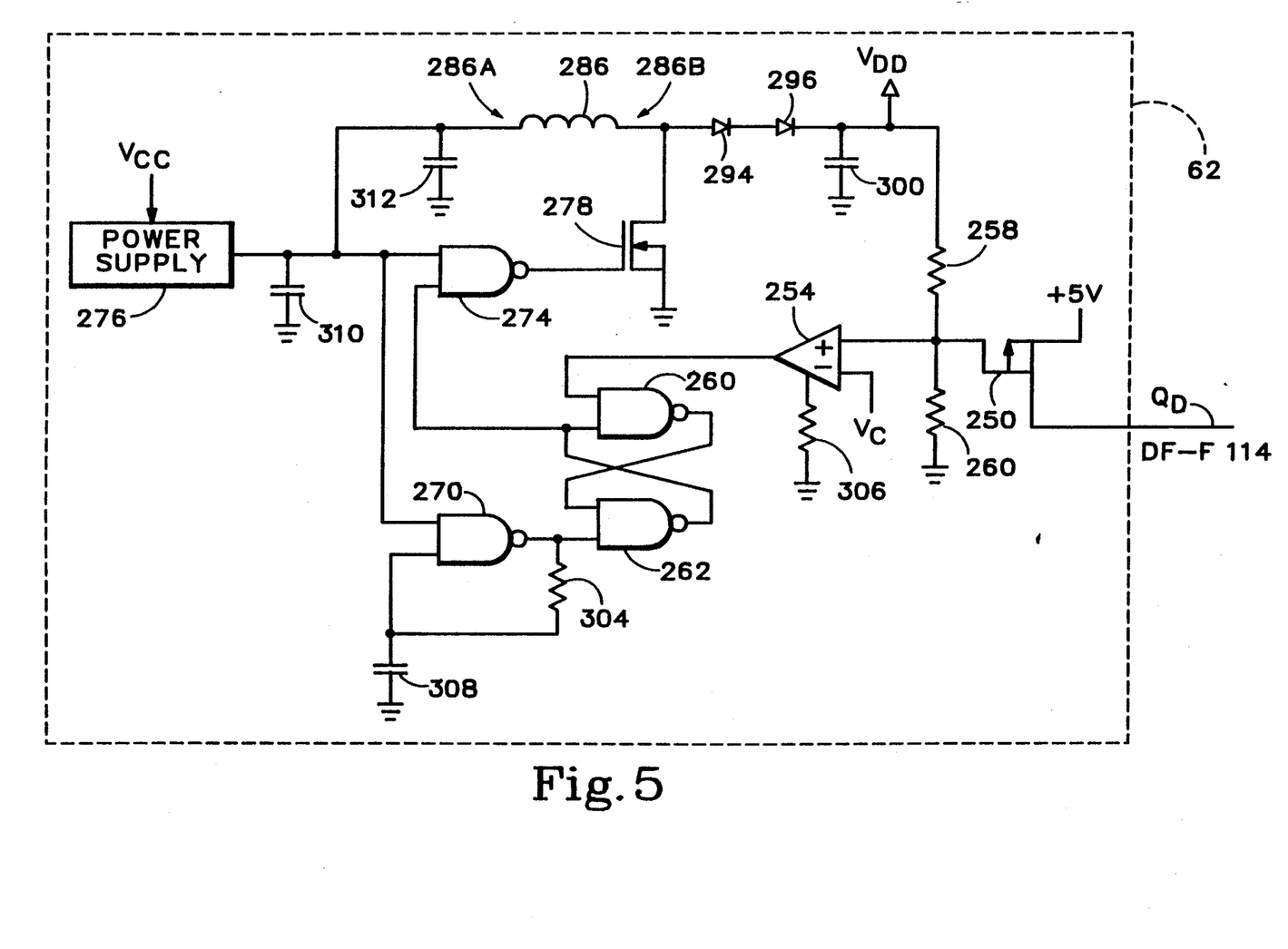
FIG. 5 shows the voltage controller block of FIG. 2 in detailed schematic form.

Referring now to FIGS. 3 and 5, the Q output of D flip-flop 114 is connected to the gate of a p-channel FET 250, which is included in voltage controller 62 shown in FIG. 5. The purpose of voltage controller 62 is to set the value of voltage VDD, which is used by driver 64. Voltage controller 62 operates as follows during stereo mode. The output Q of D flip-flop 114 in mode logic circuit 56 delivers a logic high voltage and, therefore, FET 250 does not conduct. The voltage Vc at the negative input of comparator 254 is set to be equal to about 1.235 volts. The voltage at the positive input of comparator 254 is equal to voltage VDD divided between resistors 258 and 260, which may have resistance values of about 2 Mohms and 182 kohms, respectively. The resistance values of resistors 258 and 260 are chosen so that the voltage at the positive input of comparator 254 is approximately equal to voltage Vc when VDD equals 15 volts.

The output of comparator 254 is connected to one input of NAND gate 260, the output of which is connected to one input of NAND gate 262. NAND gates 260 and 262 form an RS flip-flop. The other input to NAND gate 262 is the output of NAND gate 270, which acts as an invertor/oscillator. When the output of comparator 254 has a logic high voltage, the output of NAND gate 262 is latched to a logic high voltage. One input of NAND gate 274 is the output of NAND gate 262. The other input of NAND gate 274 is the output of power supply 276, which equals 5 volts. Accordingly, NAND gate 274 inverts the output of NAND gate 262.

When the output of NAND gate 274 has a logic low voltage, n-channel FET 278 does not conduct. Because VDD is a higher voltage than VCC, current does not flow through inductor 286. As the voltage VDD decreases, the voltage at the output of comparator 254 assumes a logic low voltage. Consequently, the voltage at the output of NAND gate 262 toggles with the toggling of the output of NAND gate 270. When the output of NAND gate 262 delivers a logic low voltage, the output of NAND gate 274 delivers a logic high voltage causing FET 278 to conduct. When FET 278 conducts, current flows from the output of power supply 276, through inductor 286, to ground at the source of FET 278.

When the output of NAND gate 262 delivers a logic high voltage, the output of NAND gate 274 delivers a logic low voltage causing FET 278 to stop conducting. When FET 278 stops conducting, current stops flowing through FET 278. However, current continues to flow through inductor 286 from point 286A to point 286B. To maintain the current, the voltage at end 286B increases substantially allowing current to flow through diodes 294 and 296. One diode is used to prevent reverse current. Two diodes are used to obtain the desired voltage drop. If VDD should be other than 15 volts, another number of diodes or diodes and resistors could be used. Capacitor 300, which may have a value of 1 microfarad, is charged because current cannot return through diode 296 as the voltage at end 286B decreases.

When receiver 28 stops receiving IR pulses, output LD of VCO 50 and Q output of D flip-flop 114 deliver logic low voltages. Accordingly, FETs 120 and 250 conduct. When FET 250 conducts, the positive input of comparator 254 receives a signal of 5 volts. As long as the voltage of the positive input of comparator 254 is greater than Vc, the output of comparator 254 delivers a logic high voltage. Consequently, the output of NAND gates 262 and 274 deliver logic high and low voltages, respectively, and FET 278 does not conduct. The voltage at point 286B equals 5 volts. The voltage at VDD equals the five volts minus the voltage drop through diodes 294 and 296, and is between 3.6 and 4 volts.

Resistors 304 and 306 may have a resistance values of 5.62 kohms and 332 kohms, respectively. Capacitors 308, 310, and 312 may have capacitance values of 100 picofarad, 10 microfarad, and 0.1 microfarad, respectively.

It will be apparent to those having skill in the art that many changes may be made in the above-described details of the preferred embodiment of the present invention without departing from the underlying principles thereof.

For example, VCO 50, mode logic circuit 56, voltage controller 62, and driver 64 may operate in the same manner regardless of the source of the electric pulse train signal received by the PCAin input of VCO 50. For example, the pulse train signal could be transmitted through a wire directly from display 114 without the use of any signal transmitted through the air. Alternatively, transmitter 26 could transmit ultrasonic signals and receiver 28 be designed to receive the ultrasonic signals.

The present invention is not restricted to the situation in which there is one IR pulse for each field. For example, transmitter 26 could transmit one IR pulse at the beginning of every other field. In that case, there would be two successive left fields and then two successive right fields displayed on display 14.

The preferred voltages of VDD in stereo and flickerless modes depends on the type of liquid crystal or other light polarization state changer being used. VDD voltages of other than 15 volts and 3.7 may be preferred in particular cases.

As described above, right- and left-eye pieces 20 and 22 are each continuously transmissive during the flickerless mode. Alternatively, right- and left-eye pieces 20 and 22 could alternate between transmissive and opaque states at a frequency above the flicker fusion rate.

A capacitive system could be used rather than counter 110 and D flip-flop 114.

The circuit of voltage controller 62 could be replaced by well known voltage controllers.

The scope of the invention should, therefore, be interpreted by the following claims.

I claim:

1. A pair of electromagnetically-linked active stereoscopic glasses for use in a stereoscopic imaging system including a display that displays stereoscopic images including right- and left-eye views, the glasses comprising:

respective right and left light polarization state changers;

a receiver that receives a train of electromagnetic synchronization pulses each synchronized with one of the stereoscopic images, the receiver producing an electrical pulse train signal corresponding to the train of electromagnetic synchronization pulses so that each electrical pulse is synchronized with one of the stereoscopic images; and self-synchronizing optical states controlling means receiving the electrical pulse train signal for producing drive signals for controlling the right and left state changers, the drive signals being timed relative to one of the electrical pulses for controlling both the right and left state changers to allow a viewer to view through the right and left state changers both the right- and left-eye views of the stereoscopic image to which the one of the electrical pulses is synchronized.

2. The glasses of claim 1 in which the train of electromagnetic synchronization pulses and the drive signals each have a primary frequency, and the optical states controlling means includes frequency tracking means and frequency generating means for controlling the primary frequency of the drive signals so that while the receiver receives the train of electromagnetic synchronization pulses the primary frequency of the drive signals is related to the primary frequency of the train of electromagnetic synchronization pulses, and while the receiver does not receive the train of electromagnetic synchronization pulses the primary frequency of the drive signals is related to the frequency of a signal generated by the frequency generating means.

3. The glasses of claim 1 in which the electrical pulse train signal has a first primary frequency and the drive signals have a second primary frequency, and the optical states controlling means includes frequency dividing means such that the second primary frequency is less than the first primary frequency.

4. The glasses of claim 1 in which state changers are variable optical retarders of the liquid crystal cell type.

5. The glasses of claim 1 in which there is one only one stereoscopic image associated with each electromagnetic pulse.

6. The glasses of claim 1 in which the optical states controller causes the glasses to operate in a stereo mode during which the drive signals cause the right- and left-eye pieces to switch between transmissive and opaque states synchronously with the displaying of the right- and left-eye views by the display, and a flickerless mode during which the drive signals cause both the right- and left-eye pieces to be essentially continuously transmissive.

7. The glasses of claim 6 in which the optical states controlling means automatically switches the glasses from stereo mode to flickerless mode in response to the receiver ceasing to receive the train of electromagnetic synchronization pulses and the optical states controlling means automatically switches the glasses from flickerless mode to stereo mode in response to the receiver receiving the train of electromagnetic synchronization pulses.

8. The glasses of claim 6 in which during flickerless mode the right and left state changers retarders switch between positive and negative voltages at a frequency that is above the flicker fusion rate.

9. The glasses of claim 6 in which the driving signals have a maximum voltage, and during flickerless mode the maximum voltage is substantially less than during stereo mode.

10. A pair of active stereoscopic glasses for use in a stereoscopic imaging system including a display that displays stereoscopic images including right- and left-eye views, the glasses comprising:

respective right and left light polarization state changers;

a conductor carrying an electrical pulse train signal of which each electrical pulse is synchronized with one of the stereoscopic images; and self-synchronizing optical states controlling means receiving the electrical pulse train signal for producing drive signals for controlling the right and left state changers, the drive signals being timed relative to one of the electrical pulses for controlling both the right and left state changers to allow a viewer to view through the right and left state changers the right- and left-eye views of the stereoscopic image to which the one of the electrical pulses is synchronized.

11. The glasses of claim 10 in which the optical states controller causes the glasses to operate in a stereo mode during which the drive signals cause the right- and left-eye pieces to switch between transmissive and opaque states synchronously with the displaying of the right- and left-eye views by the display, and a flickerless mode during which the drive signals cause both the right- and left-eye pieces to be essentially continuously transmissive.

12. The glasses of claim 11 in which the optical states controlling means automatically switches the glasses from stereo mode to flickerless mode in response to the optical states controlling means receiver ceasing to receive the electrical pulse train signal, and the optical states controlling means automatically switches the glasses from flickerless mode to stereo mode in response to the optical states controlling means beginning to receive the electrical pulse train signal.

13. The glasses of claim 10 further comprising a receiver that receives a train of synchronization pulses each synchronized with one of the stereoscopic images, the receiver producing the electrical pulse train signal in response to the train of synchronization pulses.

14. The glasses of claim 13 in which the synchronization pulses are ultrasonic pulses.

15. The glasses of claim 13 in which the synchronziation pulses are electromagnetic pulses.

16. The glasses of claim 15 in which the electromagnetic pulses have a primary frequency in the infrared range.

17. A pair of active stereoscopic glasses for use in a stereoscopic imaging system including a display that displays stereoscopic images including right- and left-eye views, the glasses comprising:

respective right and left light polarization state changers;

a conductor carrying an electrical pulse train signal of which each electrical pulse is synchronized with one of the stereoscopic images; and optical states controlling means receiving the electrical pulse train signal for producing drive signals for controlling the right and left state changers, the optical states controlling means causing the glasses to operate in a stereo mode during which the right and left state changers cause the right- and left-eye pieces to switch between transmissive and opaque states synchronously with the displaying of the right- and left-eye views by the display, and a flickerless mode during which the right- and left-eye pieces are both essentially continuously transmissive, and the optical states controlling means automatically switches the glasses from stereo mode to flickerless mode in response the the self-synchronizing optical states controlling means ceasing to receive the electrical pulse train signal and the optical states controlling means automatically switches the glasses from flickerless mode to stereo mode in response to the self-synchronizing optical states controlling means beginning to receive the electrical pulse train signal.

* * * * *